United States Patent [19]

Sasaki et al.

[11] Patent Number: 5,049,633

[45] Date of Patent: Sep. 17, 1991

[54] ETHYLENE/POLYCYCLIC MONOMER COPOLYMER, PROCESS FOR PREPARATION THEREOF, AND OPTICAL ARTICLE

[75] Inventors: Yasuaki Sasaki; Tohru Matsuoka, both of Oita, Japan

[73] Assignee: Showa Denko K.K., Tokyo, Japan

[21] Appl. No.: 417,409

[22] Filed: Oct. 5, 1989

[30] Foreign Application Priority Data

Oct. 6, 1988 [JP] Japan .................. 63-250805
Jun. 12, 1989 [JP] Japan .................. 1-149907

[51] Int. Cl.$^5$ .......................................... C08F 32/08
[52] U.S. Cl. .................... 526/281; 526/169.2; 526/280; 359/642; 359/885; 385/141
[58] Field of Search .............. 526/169.2, 281, 282, 526/280; 350/409, 96.34; 264/1.1

[56] References Cited

U.S. PATENT DOCUMENTS 4,614,778 9/1986 Kajiura et al. ............... 526/169.2 X
4,935,475 6/1990 Kishimura et al. ............ 526/281 X

FOREIGN PATENT DOCUMENTS 1211315 9/1986 Japan ...................... 526/281

Primary Examiner—Fred Teskin

Attorney, Agent, or Firm—Sughrue, Mion, Zinn, Macpeak & Seas

[57] ABSTRACT

A random copolymer comprised of recurring units derived from ethylene, recurring units derived from a polycyclic monomer of the formula (I):

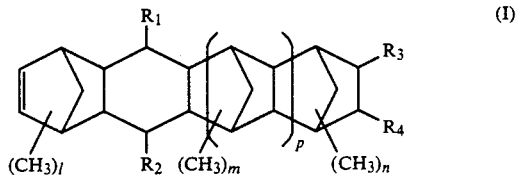

wherein l, m and n are 0 or 1, p is an integer of at least 0, $R_1$, $R_2$, $R_3$ and $R_4$ independently represent hydrogen or $C_{1-10}$ alkyl, $R_3$ and $R_4$ may together form a ring;

and recurring units derived from an optional copolymerizable monomer. The random copolymer is prepared by copolymerizing ethylene with the polycyclic monomer and an optional monomer in a hydrocarbon medium in the presence of a catalyst formed of a hydrocarbon-soluble vanadium compound and a halogen-containing organic aluminum compound. The random copolymer is used for an optical article.

11 Claims, 1 Drawing Sheet

ETHYLENE/POLYCYCLIC MONOMER COPOLYMER, PROCESS FOR PREPARATION THEREOF, AND OPTICAL ARTICLE

BACKGROUND OF THE INVENTION

1. Field of the Invention

The present invention relates to an ethylene/polycyclic monomer random copolymer, a process for the preparation of this random copolymer, and an optical article formed by molding this random copolymer.

This random copolymer has an excellent transparency, is optically homegeneous, has a small birefringence, and a well-balanced heat resistance, chemical resistance, dimensional stability, rigidity and other mechanical properties. This copolymer is valuable for use in the manufacture of an optical disk, an optical fiber, an optical filter, a plastic lens and the like.

2. Description of the Related Art

Recently, transparent resins have been used as various optical materials, and the fields of application of transparent resins as information-recording materials in particular have been broadened since the mass production of these transparent resins became possible.

Currently, a polycarbonate resin and a polymethyl methacrylate resin are mainly used as the material of an optical disk substrate. As the polycarbonate resin has a high glass transition temperature (Tg), and thus the polycarbonate resin has a high heat resistance, good transparency, dimensional stability, and mechanical properties. Nevertheless, since the hygroscopicity of the polycarbonate resin is relatively high and the birefringence is large, the optical anisotropy of the polycarbonate resin is large. Furthermore, the polycarbonate resin is weak with regard to an alkali, and the polycarbonate resin tends to undergo hydrolysis. On the other hand, the polymethyl methacrylate resin has excellent optical properties, for example, the polymethyl methacrylate resin has a high transparency and a small birefringence. Moreover, the polymethyl methacrylate has good mechanical properties. However, since the hygroscopicity of the polymethyl methacrylate resin is high, a substrate formed of this resin is easily corroded, and warping often occurs in the disk surface owing to a change of the dimension or shape. Furthermore, since the glass transition temperature (Tg) of the polymethyl methacrylate is about 100° C., distortion at a high temperature cannot be neglected. Still further, the polymethyl methacrylate has a poor solvent resistance.

A resin material having well-balanced transparency, optical properties, heat resistance, chemical resistance, dimensional stability and mechanical properties has not heretofore been known.

SUMMARY OF THE INVENTION

Under this background, an object of the present invention is to provide a resin material which has an excellent transparency, is optically homogenous and has a small birefringence, and has well balanced heat resistance, chemical resistance, dimensional stability and mechanical properties.

In accordance with one aspect of the present invention, there is provided a random copolymer which comprises recurring units derived from ethylene and recurring units derived from a polycyclic monomer represented by the following general formula (I):

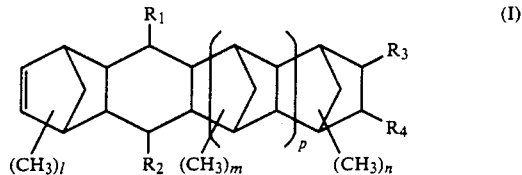

wherein e, m and n are 0 or 1, p is an integer of at least 0, $R_1$, $R_2$, $R_3$ and $R_4$, which may be the same or different, represent a hydrogen atom or an alkyl group having 1 to 10 carbon atoms, and $R_3$ and $R_4$ may together from a ring;

the molar ratio of ethylene/polycyclic monomer of the general formula (I) being in the range of from 90/10 to 10/90; the substantial part of the units derived from the polycyclic monomer represented by the general formula (I) have a structure represented by the following general formula (II):

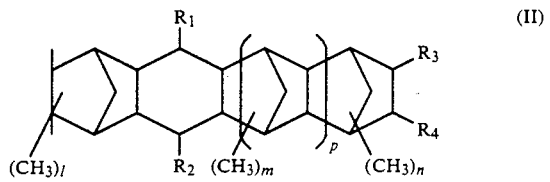

wherein e, m, n, p, $R_1$, $R_2$, $R_3$ and $R_4$ are as defined above;

and the intrinsic viscosity [$\eta$] of the random copolymer being 0.1 to 15 dl/g, as measured at 135° C. in decalin.

In accordance with another aspect of the present invention, there is provided a process for the preparation of the above-mentioned random copolymer, which comprises copolymerizing ethylene with a polycyclic monomer represented by the above-mentioned general formula (I) in a hydrocarbon medium in the presence of a catalyst formed from a hydrocarbon-soluble vanadium compound and a halogen-containing organic aluminum compound.

In accordance with still another aspect of the present invention, there is provided an optical article comprising a molded body made of the above-mentioned ethylene/polycyclic monomer random copolymer.

DESCRIPTION OF THE PREFERRED EMBODIMENTS

Figure 1:
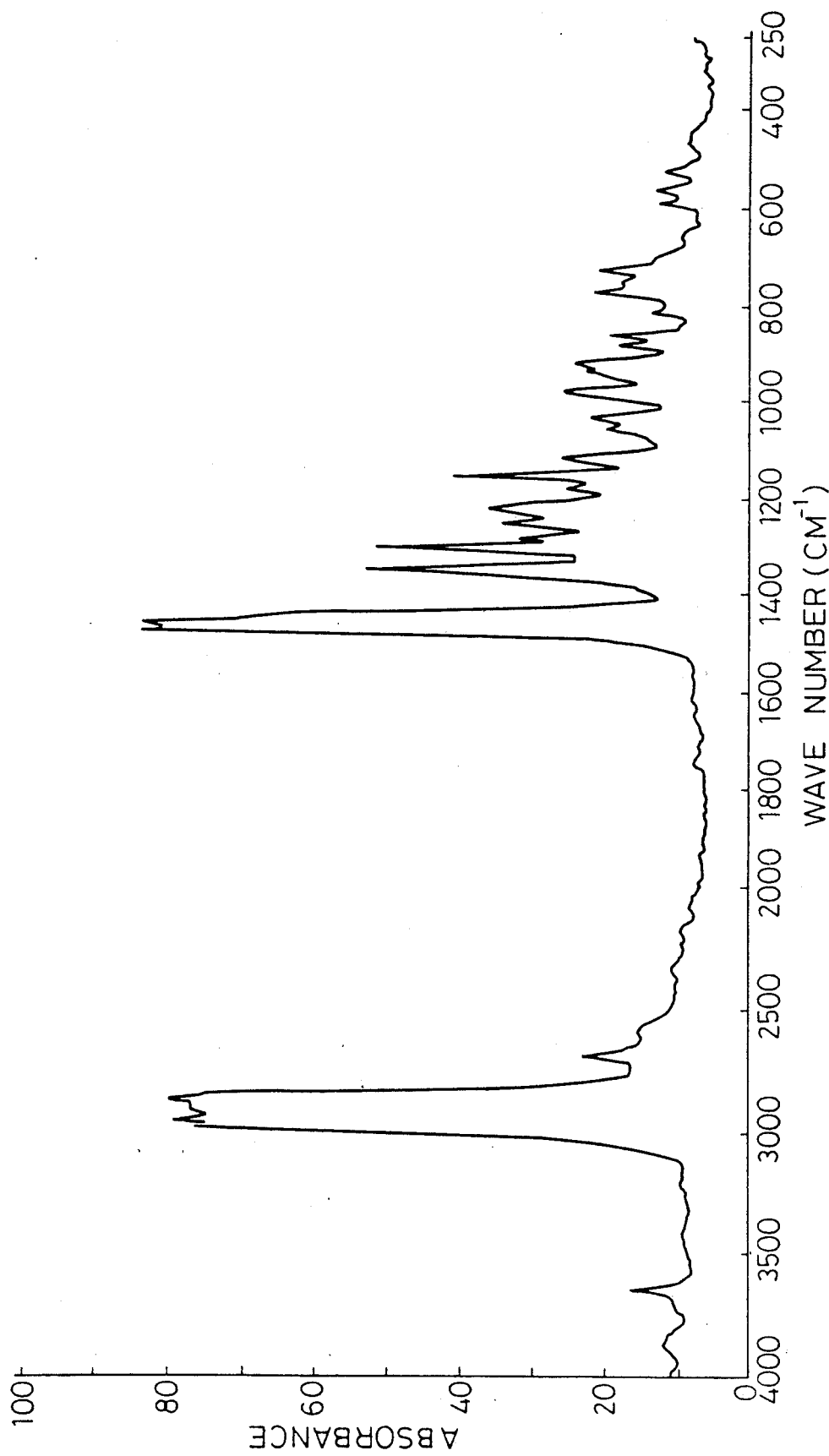
FIG. 1 is an infrared absorption spectrum of a copolymer of the present invention synthesized in Example 1 given hereinafter.

In the random copolymer of the present invention, the polycyclic monomer of the general formula (I) copolymerized with ethylene has predominantly a structure represented by the general formula (II) and is substantially free from, a structure of the following general formula (V):

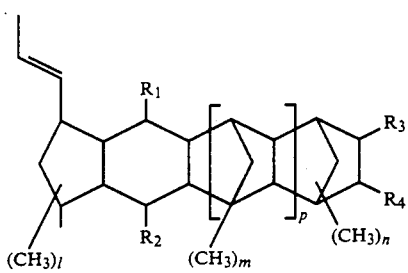

(V)

wherein e, m, n, p, $R_1$, $R_2$, $R_3$ and $R_4$ are as defined above, which is due to the ring-opening polymerization, and even if this structure (V) is contained, the amount is very small. Therefore, the random copolymer of the present invention is chemically stable.

Typical examples of the polycyclic monomer of the general formula (I) to be copolymerized with ethylene in the present invention include pentacyclo[$10.2.1.1^{5,8}.0^{2,11}.0^{4,9}$]hexadec-6-enes (hereinafter abbreviated as "PCHD compounds") which are represented by the following general formula [III]:

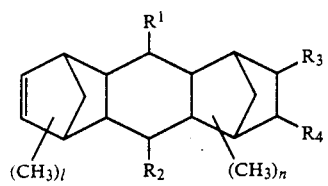

(III)

wherein e and n are 0 or 1, $R_1$, $R_2$, $R_3$ and $R_4$, which may be the same or different, represent a hydrogen atom or an alkyl group having 1 to 10 carbon atoms, and $R_3$ and $R_4$ may together form a ring, and the substantial part of the units derived from the polycyclic monomer of this type have a structure represented by the following general formula (IV):

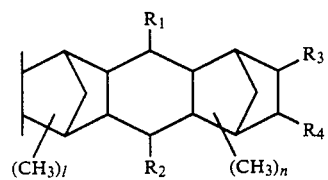

(IV)

wherein e, n $R_1$, $R_2$, $R_3$ and $R_4$ are as defined above, and are substantially free from the structure generated by the ring-opening polymerization, and even if this structure is contained the amount is very small.

The PCHD compound represented by the general formula (III) can be synthesized, for example, by the Diels-Alder reaction between a tricyclo[$6.2.1.0^{2,7}$]undec-3-ene (VI) and a cyclopentadiene (VII), which is represented by the following reaction formula:

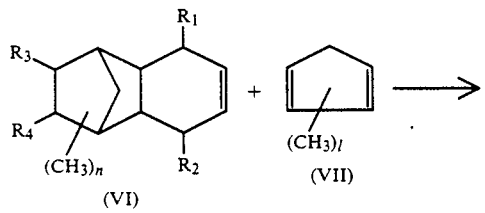

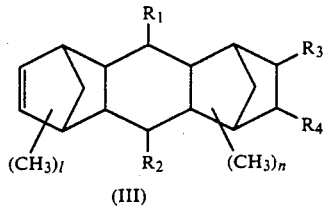

(III)

wherein e, n, $R_1$, $R_2$, $R_3$ and $R_4$ are as defined above.

In this process, the cyclopentadiene can be added directly as a monomer to the reaction system. Alternatively, a dicyclopentadiene represented by the following formula (VIII), which is thermally decomposed under reaction conditions to form a cyclopentadiene (VIII), can be used as the starting compound:

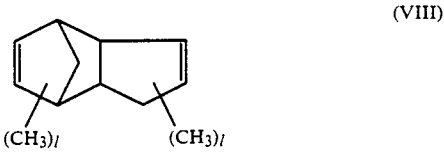

(VIII)

wherein e is 0 or 1.

The molar ratio of the tricyclo[$6.2.1.0^{2,7}$]undec-4-ene (VI) to the cyclopentadiene (VII) can be in the range of from 1/1 to 10/1 (if the dicyclopentadiene is used, this molar ratio can be in the range of from 2/1 to 20/1). In general, an increase of this molar ratio causes an increase of the selectivity, conversion and yield, and this tendency is especially prominent at a low temperature. But, if this molar ratio exceeds 5/1 (if the molar ratio exceeds 10/1 when the dicyclopentadiene is used), the conversion and yield are decreased although the selectivity is further increased. Accordingly, the preferred molar ratio is from 2/1 to 5/1 (from 4/1 to 10/1 when the dicyclopentadiene is used). The reaction temperature is preferably 100° to 300° C., more preferably 200° to 250° C. The reaction time depends on the reaction temperature, but the reaction time is preferably 10 minutes to 40 hours, more preferably 30 minutes to 30 hours. In this reaction, the formation of the polymer can be controlled by adding a polymerization inhibitor such as hydroquinone, tertbutylcatechol or p-phenylenediamine. The reaction can be carried out in a medium not inhibiting the reaction, for example, a lower alcohol such as methanol or ethanol, a hydrocarbon such as toluene or cyclohexane, or a halogenated hydrocarbon such as chloroform or tetrachloromethane, and the batchwise method, the semi-batchwise method or the continuous method can be adopted for carrying out the reaction.

The fact that the substance prepared by the reaction has a structure represented by the general formula (III) can be easily confirmed from the $^1$H-NMR spectrum, the $^{13}$C-NMR spectrum and the mass spectrum.

Other examples of the polycyclic monomer of the general formula (I) to be copolymerized with ethylene in the present invention are shown in Table 1.

TABLE 1

| | Chemical formula | Compound name |
|---|---|---|
| (a) | | Pentacyclo[10.6.1.1$^{14,17}$.0$^{2,11}$.0$^{4,9}$.0$^{13,18}$]heneicos-6-ene |
| (b) | | 15-Methyl-heptacyclo[10.6.1.1$^{14,17}$.0$^{2,11}$.0$^{4,9}$.0$^{13,18}$]-heneicos-6-ene |
| (c) | | Trimethyl-heptacyclo[10.6.1.1$^{14,17}$.0$^{2,11}$.0$^{4,9}$.0$^{13,18}$]heneicos-6-ene |
| (d) | | Nonacyclo[10.10.1.1$^{5,8}$.1$^{14,21}$.1$^{16,19}$.0$^{2,11}$.0$^{4,9}$.0$^{15,20}$]-hexacos-6-ene |
| (e) | | Methyl-3-methyl-heptacyclo[10.6.1.1$^{58}$.0$^{14,17}$.0$^{2,11}$.0$^{4,9}$.0$^{13,18}$]-heneicos-6-ene |
| (f) | | 3,15,16-Trimethyl-heptacyclo-[10.6.1.1$^{14,17}$.0$^{2,11}$.0$^{2,11}$.0$^{4,9}$.0$^{13,18}$]-Heneicos-6-ene |

The polycyclic monomers shown in Table 1 can be easily obtained by the Diels-Alder reaction between a pentacyclo[6.6.1$^{1,8}$.1$^{10,13}$.0$^{2,7}$.0$^{9,14}$]hexadec-4-ene and a cyclopentadiene.

In the random copolymer of the present invention the molar ratio of units derived from ethylene to units derived from the polycyclic monomer represented by the general formula (I) is from 10/90 to 90/10, preferably from 20/80 to 80/20.

Other copolymerizable monomer can be further copolymerized with ethylene and the polycyclic monomer represented by the general formula (I), so long as the realization of the intended object of the present invention is not hindered. As the copolymerizable monomer of this type, there can be mentioned linear and branched α-olefins having 3 to 10 carbon atoms and cyclo-olefins having 5 to 18 carbon atoms.

As specific examples of the α-olefin, there can be mentioned propylene, 1-butene, 1-hexene, 3-methyl-1-butene, 4-methyl-1-pentene, 1-octene and 1-decene, but α-olefins having 3 to 6 carbon atoms are preferred.

As specific examples of the cyclo-olefin, there can be mentioned cyclopentene cyclohexene, norbornene, methylnorbornene, ethylnorbornene, and 4,7 methano-3a,5,6,7a-tetrahydro-1H-indene.

In the case of the copolymer derived from ethylene, the polycyclic monomer represented by the general formula (I) [especially, the PCHD compound represented by the general formula (III)], and the α-olefin and/or the cyclo-olefin, the ethylene/PCHD compound molar ratio is from 10/90 to 90/10 and preferably from 20/80 to 80/20, and the molar ratio of [α-olefin and/or cycloolefin]/PCHD compound is not higher than 90/10, preferably from 90/10 to 15/85, and most preferably from 80/20 to 25/75.

As further examples of the other copolymerizable monomer, there can be mentioned styrenes such as styrene and α-methylstyrene, and polyenes such as 1,4-hexadiene. The amount of this copolymerizable monomer is generally smaller than 15 mole% based on the polycyclic monomer. The random copolymer of the present invention can be obtained by copolymerizing ethylene with a polycyclic monomer represented by the general formula (I) and, if necessary, other monomer in a hydrocarbon medium in the presence of a catalyst comprising a hydrocarbon-soluble vanadium compound and a halogen-containing organic aluminum compound. As the vanadium compound, there can be mentioned vanadium halides such as VCl$_4$ and VCl$_3$, and vanadium compounds represented by the general formula of VO(OR)$_t$X$_{3-t}$ in which R represents an alkyl group having 1 to 10 carbon atoms, X represents a halogen atom, and t is a number of $0 \leq t \leq 3$. Preferred examples of the vanadium compound are as follows:
VOCl$_3$, VOBr$_3$,
VO(OCH$_3$)Cl$_2$,
VO(OCH$_3$)$_2$Cl,
VO(OCH$_3$)$_3$,
VO(OC$_2$H$_5$)Cl$_2$,
VO(OC$_2$H$_5$)$_{1.5}$Cl$_{1.5}$, $VO(OC_2H_5)_2Cl$,
$VO(OC_2H_5)_3$,
$VO(OC_3H_7)Cl_2$,
$VO(OC_3H_7)_{1.5}Cl_{1.5}$,
$VO(OC_3H_7)_2Cl$,
$VO(OC_3H_7)_3$,
$VO(O\text{-}n\text{-}C_4H_9)Cl_2$, and
$VO(O\text{-}n\text{-}C_4H_9)_2Cl$.

These compounds can be used alone or in the form of mixtures of two or more thereof. The halogen-containing organic aluminum compound to be used in combination with the vanadium compound is represented by the general formula of $R'_u AeX'_{3-u}$ in which $R'$ represents an alkyl group having 1 to 10 carbon atoms, $X'$ represents a halogen atom, and $u$ is a number of $0 < u < 3$, preferably $1 \leq u \leq 2$. As preferred examples of the halogen-containing organic aluminum compound, there can be mentioned dimethyl-aluminum chloride, methyl-aluminum dichloride, diethyl-aluminum chloride, ethyl-aluminum sesquichloride, ethyl-aluminum dichloride, di-n-propyl-aluminum chloride, n-propyl-aluminum dichloride, diisobutyl-aluminum chloride and isobutyl-aluminum dichloride. These aluminum compounds can be used alone or in the form of mixtures of two or more thereof.

The vanadium compound and the halogen-containing organic aluminum compound are used in amounts such that the Ae/V molar ratio is from 1 to 30, preferably from 2 to 20.

The copolymerization is carried out in a hydrocarbon medium. As the hydrocarbon medium, there can be mentioned aliphatic hydrocarbons such as hexane, heptane, octane, decane and kerosine, aromatic hydrocarbons such as benzene, toluene and xylene, and alicyclic hydrocarbons such as cyclohexane. These hydrocarbon solvents can be used alone or in the form of mixtures of two or more thereof.

The concentration of the vanadium compound used as the catalyst in the hydrocarbon medium is 0.1 to 30 millimoles per liter and preferably 0.2 to 10 millimoles per liter.

The charge ratio between ethylene and the polycyclic monomer represented by the general formula (I) is changed according to the composition of the copolymer, the polymerization temperature and the kind of the solvent, but the ethylene/polycyclic monomer charge ratio is from 1/1 to 1/100 by mole. When ethylene is copolymerized with polycyclic monomer represented by the general formula (I), especially the PCHD compound represented by the general formula (III), and the α-olefin and/or the cyclo-olefin, the ethylene/PCHD compound molar ratio is generally from 1/1 to 1/100, and the (α-olefin and/or cyclo-olefin)/PCHD compound molar ratio is not higher than 1/10, preferably from 1/50 to 10/1.

The polymerization temperature is generally −60 to 100° C. and preferably −30° to 50° C. The polymerization pressure is generally 0 to 50 kg/cm² and preferably 0 to 30 kg/cm². In the present invention, hydrogen can be used for adjusting the molecular weight of the copolymer.

The intrinsic viscosity [η] of the copolymer of the present invention is 0.1 to 15 dl/g, preferably 0.5 to 8 dl/g, as determined at 135° C. in decalin. To maintain a good balance among the heat resistance, mechanical properties and molding processability, preferably the intrinsic viscosity of the copolymer is within the above-mentioned range.

The novel random copolymer of the present invention is usually amorphous or lowly crystalline, but to manifest an excellent transparency, preferably the random copolymer is amorphous. The crystallinity by X-rays is not higher than 5% and is 0% in many cases. In most of the copolymers of the present invention, the melting point is not observed by a differential scanning calorimeter (DSC). The copolymer of the present invention has a high glass transition temperature, and the glass transition temperature is generally 80° to 230° C., more preferably 100° to 200° C. Accordingly, the copolymer of the present invention has an excellent heat resistance. The copolymer obtained by using the polycyclic monomer of the general formula (I), in which p is at least 1, has a higher glass transition temperature than that of the copolymer obtained by using the polycyclic monomer of the general formula (I), in which p is 0, i.e., the PCHD compound represented by the general formula (III), when the comparison is based on the same ethylene content. The copolymer obtained by copolymerizing ethylene with the PCHD compound and the α-olefin and/or the cyclo-olefin has a higher glass transition temperature than that of the copolymer composed solely of ethylene and the PCHD compound, even if the content of the PCHD compound is reduced. Accordingly, in the copolymer of this type, the amount of the expensive PCHD compound used can be reduced.

The novel random copolymer of the present invention can be molded into various shapes by compression molding, extrusion molding injection molding and blow molding customarily adopted for usual synthetic resins. For a formation of these molded articles, additives such as stabilizers against light, heat, oxygen and ozone, flame retardants, plasticizers, lubricants, antistatic agents, fillers, colorants and reinforcers can be incorporated into the copolymer of the present invention according to need.

Furthermore, the novel random copolymer of the present can be used in combination with various known polymers. For example, there can be mentioned polyolefins, e.g., homopolymers of α-olefins such as ethylene, propylene, butene-1, hexene-1 and 4-methylpentene-1 and copolymers of two or more of these α-olefins, styrene polymers, e.g., polystyrene, poly-α-methylstyrene, an acrylonitrile/styrene copolymer and an acrylonitrile/butadiene/styrene copolymer, polydienes, e.g., polybutadiene and polystyrene, polyesters, e.g., polyethylene terephthalate and polybutylene terephthalate, polyamides, e.g., nylon 6, nylon 66, nylon 11 and nylon 12 halogen-containing polymers, e.g., polyvinyl chloride and polyvinylidene chloride, poly(meth)acrylates, e.g., polymethyl acrylate and polymethyl methacrylate, and polycarbonate and polyacetal.

The ethylene/polycyclic monomer copolymer of the present invention has good optical characteristics such as good transparency and low birefringence, high heat resistance, chemical resistance, mechanical properties, and dimensional stability. Accordingly, the copolymer of the present invention is valuable for use in the manufacture of optical disks such as a digital audio disk, a video disk and a computer disk, optical fibers, plastic lenses and optical filters. Moreover, the copolymer of the present invention can be used for a windowpane of a building or vehicle, and for a medicinal or chemical article such as an injector, a beaker or a graduated cylinder.

The present invention will now be described in detail with reference to the following examples.

EXAMPLE 1

Synthesis of pentacyclo[10.2.1.1$^{5,8}$.0$^{2,22}$.0$^{4,9}$]hexadec-6-ene (PCHD)

An autoclave having a capacity of 10 e was charged with 4.04 kg (27.2 moles of tricyclo[6.2.1.0$^{2,7}$]undec-4-ene and 0.6 kg (4.54 moles) of dicyclopentadiene and the inner atmosphere was replaced by nitrogen. The mixture was heated at 230° C. with stirring for 10 hours under a maximum pressure of 2.2 kg/cm$^2$. The reaction mixture was subjected to distillation under a reduced pressure to obtain 1.35 kg of pentacyclo[10.2.1.1$^{5,8}$.0$^{2,11}$.0$^{4,9}$]-hexadec-6-ene as a fraction boiling at 107° C. under 2 mmHg.

The compound was identified by the GC-MASS spectrum, $^1$H-NMR spectrum and $^{13}$C-NMR spectrum.

Copolymerization of ethylene with PCHD

A four-neck flask having a capacity of 10 e and equipped with a stirrer, a thermometer, a dropping funnel, and a gas-blowing tube was charged with 5 e of dehydrated toluene after a replacement of the inner atmosphere with nitrogen. Then, 700 g of PCHD and 10 millimoles of VOCl$_2$(OEt) were charged into the flask, and 20 ml of a toluene solution containing 20 millimoles of Et$_3$Al$_2$Cl$_3$ was charged in the dropping funnel. A gaseous mixture of 140 e/hr of ethylene and 400 e/hr of nitrogen was passed through the flask cooled to 10° C. by ice water from the gas blowing tube for 15 minutes. Copolymerization was initiated by adding Et$_3$Al$_2$Cl$_3$ dropwise from the dropping funnel, and the copolymerization was conducted at 10° C. for 30 minutes. During the copolymerization, the polymerization mixture was kept homogeneous and no precipitation of a copolymer was observed. The copolymerization was stopped by an addition of 60 ml of methanol. The formed copolymer was precipitated by throwing the polymerization liquid into a large quantity of methanol. The formed copolymer was washed with methanol and vacuum-dried at 50° C. to obtain 350 g of the copolymer.

By a $^{13}$C-NMR analysis, it was confirmed that the ethylene content in the copolymer was 55 mole%, and the intrinsic viscosity [η] of the copolymer measured at 135° C. in decalin was 1.2 dl/g. The iodine value indicating the amount of unsaturated bonds was 0.6.

When the transparency was measured according to ASTM D1003-52 by using a disk having a diameter of 50 mm and a thickness of 1 mm, which was formed by injection molding, it was found that the haze was 8%. When the birenfringence was measured by the ellipsometer method (light source wavelength=830 nm), using the same test piece, it was found that the birefringence was 7 nm.

When the melting point Tm and glass transition temperature Tg were measured by using a DSC Model 7 supplied by Perkin-Elmer, it was found that the melting curve was not present in the range of from −30° C. to 400° C., and the Tg was 150° C.

When the flexural modulus and yield strength were measured according to ASTM D790 by using a press-molded sheet having a thickness of 2 mm, it was found that the flexural modulus was 2.0×10$^4$ kg/cm$^2$ and the yield strength was 910 kg/cm$^2$.

To evaluate the chemical resistance, a press-molded sheet having a thickness of 1 mm was immersed in acetone, ethyl acetate, sulfuric acid (98%) or aqueous ammonia (28%) at room temperature for 20 hours and the change of the appearance was checked. The color or transparency was not changed, and deformation or cracking did not occur.

The infrared absorption spectrum of the copolymer obtained in this example is shown in FIG. 1.

EXAMPLE 2 THROUGH 7

Copolymerization was carried out in the same manner as described in Example 1 except that copolymerization conditions were changed as indicated in Table 2. The results are shown in Table 2 and 3.

EXAMPLE 8 THROUGH 10

Copolymerization was carried out in the same manner as described in Example 1 except that a monomer shown in Table 4 was used instead of PCHD. The results are shown in Tables 2 and 3.

TABLE 2

| Example No. | Catalyst VO(OEt)Cl$_2$ (millimoles) | Et$_3$Al$_2$Cl$_3$ (millimoles) | PCHD (g) | Ethylene (l/hr) | Polymerization temperature (°C.) | Yield of copolymer (g) |
|---|---|---|---|---|---|---|
| 1 | 10 | 20 | 700 | 140 | 10 | 350 |
| 2 | 10 | 20 | 700 | 280 | 10 | 460 |
| 3 | 10 | 20 | 700 | 70 | 10 | 200 |
| 4 | 10 | 20 | 500 | 140 | 20 | 330 |
| 5 | 2.5 | 5 | 700 | 140 | 10 | 250 |
| 6 | 25 | 70 | 700 | 140 | 10 | 500 |
| 7 | 25 | 250 | 700 | 140 | 10 | 680 |
| 8 | 10 | 20 | 700*1 | 140 | 10 | 320 |
| 9 | 10 | 20 | 700*2 | 140 | 10 | 300 |
| 10 | 10 | 20 | 700*3 | 140 | 10 | 340 |

Note
*1 monomer (a) shown in Table 4 was used
*2 monomer (b) shown in Table 4 was used
*3 monomer (c) shown in Table 4 was used

TABLE 3

| Example No. | Ethylene content (mole %) | [η] 135° C. (dl/g) | Iodine value | Tg (DSC) (°C.) | Tm (DSC) (°C.) | Haze (%) | Flexural modulus (kg/cm$^2$) | Flexural yield strength (kg/cm$^2$) | Birefringence (nm) | Chemical resistance* Acetone | Ethyl acetate | Sulfuric acid (98%) | Aqueous ammonia (28%) |
|---|---|---|---|---|---|---|---|---|---|---|---|---|---|
| 1 | 55 | 1.2 | 10.6 | 150 | — | 8 | 2.0 × 10$^4$ | 910 | 7 | ○ | ○ | ○ | ○ |

TABLE 3-continued

| Example No. | Ethylene content (mole %) | [η] 135° C. (dl/g) | Iodine value | Tg (DSC) (°C.) | Tm (DSC) (°C.) | Haze (%) | Flexural modulus (kg/cm²) | Flexural yield strength (kg/cm²) | Bire-fringence (nm) | Chemical resistance* Acetone | Ethyl acetate | Sulfuric acid (98%) | Aqueous ammonia (28%) |
|---|---|---|---|---|---|---|---|---|---|---|---|---|---|
| 2 | 67 | 1.5 | 0.7 | 130 | — | 10 | $1.9 \times 10^4$ | 830 | 9 | ○ | ○ | ○ | ○ |
| 3 | 51 | 1.0 | 0.8 | 165 | — | 7 | $2.3 \times 10^4$ | 880 | 6 | ○ | ○ | ○ | ○ |
| 4 | 60 | 1.4 | 0.8 | 141 | — | 9 | $2.0 \times 10^4$ | 720 | 10 | ○ | ○ | ○ | ○ |
| 5 | 52 | 1.7 | 1.0 | 161 | — | 8 | $2.2 \times 10^4$ | 890 | 8 | ○ | ○ | ○ | ○ |
| 6 | 54 | 0.8 | 0.8 | 147 | — | 7 | $2.0 \times 10^4$ | 1,000 | 9 | ○ | ○ | ○ | ○ |
| 7 | 75 | 2.2 | 0.6 | 110 | — | 10 | $1.6 \times 10^4$ | 620 | 12 | ○ | ○ | ○ | ○ |
| 8 | 55 | 1.2 | 1.0 | 153 | — | 9 | $2.0 \times 10^4$ | 890 | 10 | ○ | ○ | ○ | ○ |
| 9 | 53 | 1.3 | 0.9 | 156 | — | 8 | $2.1 \times 10^4$ | 960 | 8 | ○ | ○ | ○ | ○ |
| 10 | 51 | 1.1 | 0.8 | 160 | — | 7 | $2.2 \times 10^4$ | 770 | 6 | ○ | ○ | ○ | ○ |

*"○" indicates good.

TABLE 4

| | Chemical formula | Compound name |
|---|---|---|
| (e) | 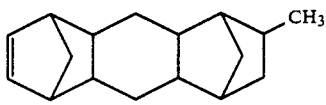 | 13-Methyl-pentacyclo[10.2.1.1$^{5,8}$.0$^{2,11}$.0$^{4,9}$]hexadec-6-ene |
| (b) | 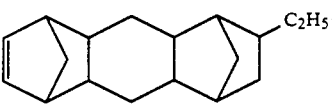 | 13-Ethyl-6-pentacyclo[10.2.1.1$^{5,8}$.0$^{2,11}$.0$^{4,9}$]hexadec-6-ene |
| (c) | 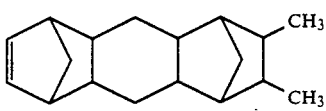 | 13,14-Dimethyl-pentacyclo[10.2.1.1$^{5,8}$.0$^{2,11}$.0$^{4,9}$]hexadec-6-ene |

EXAMPLE 11

Copolymerization of ethylene with PCHD and propylene

A four-neck flask having a capacity of 10 ℓ and equipped with a stirrer, a thermometer, a dropping funnel and a gas-blowing tube was charged with 5 ℓ of dehydrated toluene after a replacement of the inner atmosphere with nitrogen. Then, 500 g of PCHD synthesized in the same manner as described in Example 1 and 10 millimoles of VO(OEt)Cl₂ were charged into the flask while 20 millimoles of Et₃Al₂Cl₃ was charged in the dropping funnel. A mixed gas of 140 l/hr of ethylene, 180 l/hr of propylene, and 1,000 l/hr of nitrogen was passed through the flask cooled to 10° C. by ice water from the gas-blowing tube for 15 minutes. Copolymerization was initiated by adding Et₃Al₂Cl₃ dropwise from the dropping funnel, and the copolymerization was carried out at 10° C. for 30 minutes. During the copolymerization, the polymerization mixture was kept homogeneous and precipitation of a copolymer was not observed. The copolymerization was stopped by an addition of 60 ml of methanol. The formed copolymer was precipitated by throwing the polymerization solution into a large quantity of methanol. The precipitated copolymer was washed with methanol and vacuum-dried at 50° C. to obtain 310 g of the copolymer.

By ¹³C-NMR analysis, it was confirmed that the ethylene content in the copolymer was 45 mole%, and the intrinsic viscosity [η] of the copolymer was 2.3 as measured at 135° C. in decalin.

When the physical properties of the copolymer were measured in the same manner as described in Example 1, it was found that the haze was 8% and the birefringence was 10 nm. The melting curve was not observed in the range of from −30° C. to 400° C., and the glass transition point Tg was 125° C. The flexural modulus was $1.7 \times 10^4$ kg/cm² and the yield strength was 800 kg/cm². A press-molded sheet having a thickness of 1 mm was immersed in acetone, ethyl acetate, sulfuric acid (98%) or aqueous ammonia (28%) at room temperature for 20 hours, and the change of the appearance was checked. The color or transparency was not changed, and deformation or cracking did not occur.

EXAMPLES 12 THROUGH 21

Copolymerization was carried out in the same manner as described in Example 11 except that copolymerization conditions were changed as shown in Table 5. The results are shown in Table 5 and 6.

TABLE 5

| Example No. | Catalyst (millimoles) VO(OEt)Cl₂ | Et₃Al₂Cl₃ | PCHD (g) | Ethylene (l/hr) | α-Olefin Kind | (l/hr) | Cyclo-olefin Kind | (g) | Polymerization temperature (°C.) | Yield of copolymer (g) |
|---|---|---|---|---|---|---|---|---|---|---|
| 11 | 10 | 20 | 500 | 140 | Propylene | 180 | | | 10 | 310 |
| 12 | 10 | 20 | 500 | 70 | Propylene | 200 | | | 10 | 190 |
| 13 | 10 | 20 | 350 | 140 | Propylene | 150 | Norbornene | 150 | 10 | 220 |
| 14 | 10 | 20 | 500 | 140 | 1-Butene | 200 | | | 10 | 210 |
| 15 | 10 | 20 | 500 | 140 | | | Norbornene | 250 | 10 | 380 |
| 16 | 10 | 20 | 500 | 140 | | | MNB** | 150 | 10 | 390 |
| 17 | 10 | 20 | 250 | 140 | | | Norbornene | 200 | 20 | 340 |

TABLE 5-continued

| Example No. | Catalyst (millimoles) | | PCHD (g) | Ethylene (l/hr) | α-Olefin | | Cyclo-olefin | | Polymerization temperature (°C.) | Yield of copolymer (g) |
|---|---|---|---|---|---|---|---|---|---|---|
| | VO(OEt)Cl$_2$ | Et$_3$Al$_2$Cl$_3$ | | | Kind | (l/hr) | Kind | (g) | | |
| 18 | 10 | 20 | 150 | 140 | 1-Hexene | 200 (g) | | | 10 | 130 |
| 19 | 10 | 20 | 400 | 60 | 1-Hexene | 200 (g) | | | 10 | 175 |
| 20 | 5 | 15 | 500 | 140 | 1-Butene | 150 | | | 10 | 145 |
| 21 | 25 | 70 | 350 | 140 | | | Norbornene | 300 | 10 | 400 |

Note
MNB**: Methylnorbornene

TABLE 6

| Example No. | Composition (mole %) | | | | [η] (dl/g) | Tg (DSC) (°C.) | Tm (DSC) (°C.) | Haze (%) | Birefringence (nm) | Flexural modulus (kg/cm$^2$) | Flexural yield strength (kg/cm$^2$) | Chemical resistance* | | | |
|---|---|---|---|---|---|---|---|---|---|---|---|---|---|---|---|
| | PCHD | Ethylene | α-Olefin | Cyclo-olefin | | | | | | | | Acetone | Ethyl acetate | Sulfuric acid (98%) | Aqueous ammonia (28%) |
| 11 | 35 | 45 | 20 | — | 2.3 | 125 | Not observed | 8 | 10 | 17,000 | 800 | ○ | ○ | ○ | ○ |
| 12 | 40 | 30 | 30 | — | 1.8 | 135 | Not observed | 8 | 9 | 20,000 | 950 | ○ | ○ | ○ | ○ |
| 13 | 24 | 40 | 21 | 15 | 1.6 | 115 | Not observed | 10 | 8 | 18,000 | 780 | ○ | ○ | ○ | ○ |
| 14 | 35 | 45 | 20 | — | 1.8 | 125 | Not observed | 9 | 7 | 17,000 | 830 | ○ | ○ | ○ | ○ |
| 15 | 24 | 41 | — | 25 | 2.0 | 145 | Not observed | 10 | 9 | 24,000 | 980 | ○ | ○ | ○ | ○ |
| 16 | 33 | 40 | — | 27 | 3.3 | 146 | Not observed | 9 | 9 | 24,000 | 1,030 | ○ | ○ | ○ | ○ |
| 17 | 23 | 52 | — | 25 | 3.0 | 123 | Not observed | 10 | 10 | 21,000 | 980 | ○ | ○ | ○ | ○ |
| 18 | 17 | 74 | 9 | — | 3.1 | 72 | Not observed | 13 | 13 | — | — | ○ | ○ | ○ | ○ |
| 19 | 50 | 30 | 20 | — | 2.1 | 161 | Not observed | 7 | 8 | 25,000 | 1,070 | ○ | ○ | ○ | ○ |
| 20 | 40 | 45 | 15 | — | 2.5 | 136 | Not observed | 9 | 8 | 20,000 | 870 | ○ | ○ | ○ | ○ |
| 21 | 28 | 44 | — | 28 | 1.9 | 140 | Not observed | 8 | 7 | 22,000 | 800 | ○ | ○ | ○ | ○ |

*"○" indicates good.

EXAMPLE 22

Copolymerization of ethylene with polycyclic monomer (a) shown in Table 1

A four neck flask having a capacity of 10 e and equipped with a stirrer, a thermometer, a dropping funnel and a gas-blowing tube was charged with 5 e of dehydrated toluene after a replacement of the inner atmosphere with nitrogen. Then, 100 g of compound (a) shown in Table 1 and 10 millimoles of VO(OEt)Cl$_2$ were charged into the flask while 20 millimoles of Et$_3$Al$_2$Cl$_3$ was charged into the dropping funnel. A mixed gas of 140 l/hr of ethylene and 1,000 l/hr of nitrogen was passed through the flask cooled to 10° C. by ice water for 15 minutes from the gas-blowing tube. Copolymerization was initiated by adding Et$_3$Al$_2$Cl$_3$ dropwise from the dropping funnel, and the copolymerization was carried out at 10° C. for 30 minutes. During the copolymerization, the polymerization mixture was kept homogeneous and precipitation of a copolymer did not occur. The copolymerization was stopped by an addition of 60 ml of methanol. The copolymer was precipitated by throwing the polymerization solution into a large quantity of methanol, washed with methanol and vacuum-dried at 50° C. to obtain 225 g of the copolymer.

By $^{13}$C-NMR analysis, it was found that the ethylene content in the copolymer as 65 mole%, and the intrinsic viscosity [η] of the copolymer was 1.1 as measured at 135° C. in decalin.

When the physical properties of the copolymer were measured in the same manner as described in Example 1, it was found that the haze was 10% and the birefringence was 10 nm. The melting curve was not observed in the range of from −30° C. to 400° C., and the glass transition point Tg was 142° C. The flexural modulus was 2.4×10$^4$ kg/cm$^2$ and the yield strength was 890 kg/cm$^2$. A press-molded sheet having a thickness of 1 mm was immersed in acetone, ethyl acetate, sulfuric acid (98%) or aqueous ammonia (28%) at room temperature for 20 hours. The color or transparency was not changed, and deformation or cracking did not occur.

EXAMPLES 23 THROUGH 28

The copolymerization was carried out in the same manner as described in Example 22 except that the polycyclic monomer component and copolymerization conditions were changed as shown in Table 7. The results are shown in Tables 7 and 8.

TABLE 7

| Example No. | Catalyst (millimoles) | | Polycyclic monomer | | Ethylene (l/hr) | Polymerization temperature (°C.) | Yield of copolymer (g) |
|---|---|---|---|---|---|---|---|
| | VO(OEt)Cl$_2$ | Et$_3$Al$_2$Cl$_3$ | Kind* | Amount (g) | | | |
| 22 | 10 | 20 | (a) | 700 | 140 | 10 | 225 |
| 23 | 10 | 20 | (a) | 700 | 280 | 10 | 320 |
| 24 | 10 | 20 | (a) | 500 | 70 | 10 | 175 |

TABLE 7-continued

| Example No. | Catalyst (millimoles) | | Polycyclic monomer | | Ethylene (1/hr) | Polymerization temperature (°C.) | Yield of copolymer (g) |
|---|---|---|---|---|---|---|---|
| | VO(OEt)Cl$_2$ | Et$_3$Al$_2$Cl$_3$ | Kind* | Amount (g) | | | |
| 25 | 10 | 20 | (b) | 700 | 140 | 10 | 215 |
| 26 | 10 | 20 | (b) | 500 | 200 | 10 | 230 |
| 27 | 10 | 20 | (f) | 500 | 140 | 10 | 150 |
| 28 | 10 | 50 | (a)/(f) | 500/200 | 200 | 10 | 200 |

Note
*the alphabet indicates the same kind as in Table 1.

TABLE 8

| Example No. | Ethylene content (mole %) | [η] 135° C. (dl/g) | Tg (DSC) (°C.) | Tm (DSC) (°C.) | Haze (%) | Flexural modulus (10$^4$ kg/cm$^2$) | Flexural yield strength (kg/cm$^2$) | Birefringence (nm) | Chemical resistance* | | | |
|---|---|---|---|---|---|---|---|---|---|---|---|---|
| | | | | | | | | | Acetone | Ethyl acetate | Sulfuric acid (98%) | Aqueous ammonia (28%) |
| 22 | 65 | 1.1 | 142 | Not observed | 10 | 2.4 | 890 | 10 | ○ | ○ | ○ | ○ |
| 23 | 75 | 1.3 | 125 | Not observed | 11 | 2.0 | 920 | 13 | ○ | ○ | ○ | ○ |
| 24 | 58 | 1.0 | 160 | Not observed | 8 | 2.5 | 950 | 9 | ○ | ○ | ○ | ○ |
| 25 | 65 | 0.9 | 145 | Not observed | 7 | 2.4 | 810 | 8 | ○ | ○ | ○ | ○ |
| 26 | 74 | 1.5 | 130 | Not observed | 8 | 1.9 | 760 | 9 | ○ | ○ | ○ | ○ |
| 27 | 70 | 1.2 | 145 | Not observed | 9 | 2.3 | 790 | 10 | ○ | ○ | ○ | ○ |
| 28 | 71 | 1.6 | 140 | Not observed | 10 | 2.2 | 990 | 8 | ○ | ○ | ○ | ○ |

*"○" indicates good.

EXAMPLE 29

PCHD was synthesized in the same manner as described in Example 1, and ethylene was copolymerized with this PCHD in the same manner as described in Example 1 except that the amount charged of PCHD was changed to 500 g and a mixed gas of 140 1/hr of ethylene and 350 1/hr of nitrogen was supplied. As a result, 290 g of a copolymer was obtained.

The physical properties of the obtained copolymer were determined in the same manner as described in Example 1. The ethylene content in the copolymer was 55 mole% and the intrinsic viscosity [η] was 1.3. The haze value was 6% and the birefringence was 6 nm. When the melting point Tm and the glass transition point Tg were measured, it was found that the melting curve was not observed in the range of from −30° C. to 400° C. and the Tg was 145° C. The flexural modulus was 1.9×10$^4$ kg/cm$^2$ and the yield strength was 880 kg/cm$^2$. To evaluate chemical resistance of the copolymer, a press-molded sheet having a thickness of 1 mm was immersed in acetone, ethyl acetate, sulfuric acid (98%) or aqueous ammonia (28%) at room temperature for 20 hours, and the change of the appearance was checked. The color or transparency was not changed, and deformation or cracking did not occur.

EXAMPLES 30 THROUGH 32

An ethylene/polycyclic monomer was prepared in the same manner as described in Example 29 except that a polycyclic monomer shown in Table 4 was used instead of PCHD, and the copolymer was evaluated as an optical material. The results are shown in Table 9.

TABLE 9

| Example No. | Polycyclic monomer | Ethylene content (mole %) | [η] 135° C. (dl/g) | Tg (DSC) (°C.) | Tm (DSC) (°C.) | Haze (%) | Flexural modulus (10$^4$ kg/cm$^2$) | Flexural yield strength (kg/cm$^2$) | Birefringence (nm) | Chemical resistance* | | | |
|---|---|---|---|---|---|---|---|---|---|---|---|---|---|
| | | | | | | | | | | Acetone | Ethyl acetate | Sulfuric acid (98%) | Aqueous ammonia (28%) |
| 29 | PCHD | 55 | 1.3 | 145 | Not observed | 6 | 1.9 | 880 | 6 | ○ | ○ | ○ | ○ |
| 30 | (a) | 60 | 1.5 | 139 | Not observed | 9 | 1.8 | 900 | 8 | ○ | ○ | ○ | ○ |
| 31 | (b) | 63 | 1.6 | 136 | Not observed | 8 | 1.7 | 920 | 10 | ○ | ○ | ○ | ○ |
| 32 | (c) | 58 | 1.4 | 146 | Not observed | 7 | 1.8 | 910 | 7 | ○ | ○ | ○ | ○ |

*"○" indicates good.

We claim:

1. A random copolymer which comprises recurring units from ethylene and recurring units from a polycyclic monomer represented by the following general formula (I):

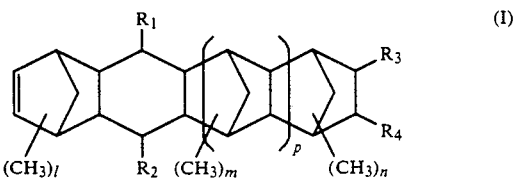

(I)

wherein
e, m, and n are 0 or 1, p is an integer of at least 0,

R$_1$, R$_2$, R$_3$, and R$_4$ independently represent a hydrogen atom or an alkyl group having 1 to 10 carbon atoms, and R$_3$ and R$_4$ may together form a ring;

the molar ratio of ethylene/polycyclic monomer of the general formula (I) is in the range of from 90/10 to 10/90;

a substantial part of the units derived from the polycyclic monomer represented by general formula (I) have a structure represented by general formula (II):

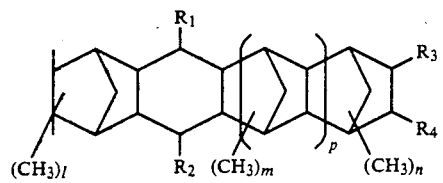

wherein e, m, n, p, R$_1$, R$_2$, R$_3$ and R$_4$ are as defined above; and the intrinsic viscosity ($\eta$) of the random copolymer is 0.1 to 15 dl/g, as measured at 135° C. in decalin.

2. A random copolymer as set forth in claim 1, wherein the polycyclic monomer is a pentacyclo(10.2.1.1$^{5,8}$.0$^{2,11}$.0$^{4,9}$)hexadec-6-ene represented by general formula (III):

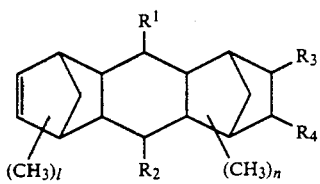

wherein e and n are 0 or 1,

R$_1$, R$_2$, R$_3$, and R$_4$ independently represent a hydrogen atom or an alkyl group having 1 to 10 carbon atoms, and R$_3$ and R$_4$ may together form a ring; and a substantial part of the units derived from the polycyclic monomer represented by general formula (III) have a structure represented by general formula (IV):

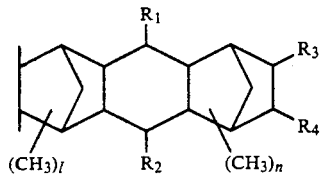

wherein e, n, R$_1$, R$_2$, R$_3$ and R$_4$ are as defined above.

3. A random copolymer as set forth in claim 2, which consists essentially of recurring units of ethylene and recurring units from the pentacyclo(10.2.1.1$^{5,8}$.0$^{2,11}$.0$^{4,9}$) hexadec-6-ene represented by general formula (III).

4. A random copolymer as set forth in claim 2, which consists essentially of recurring units from ethylene, recurring units from the polycyclic monomer represented by general formula (III), and recurring units from at least one monomer selected from the group consisting of α-olefins having 3 to 10 carbon atoms and cyclo-olefins having 5 to 18 carbon atoms, wherein the molar ration of ethylene/polycyclic monomer of general formula (III) is in the range of from 90/10 to 10/90;

the molar ratio of the monomer selected from the group consisting of the α-olefins and cyclo-olefins to the polycyclic monomer represented by the general formula (III) is not higher than 90/10; and a substantial part of the units derived from the polycyclic monomer represented by general formula (III) have a structure represented by general formula (IV).

5. A process for the preparation of a random copolymer, which comprises copolymerizing ethylene with a polycyclic monomer represented by general formula (I):

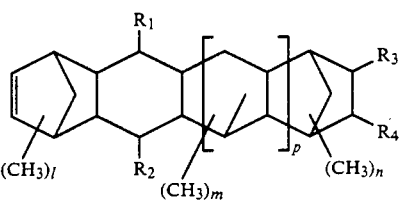

wherein e, m, and n are 0 or 1, p is an integer of at least 0, and

R$_1$, R$_2$, R$_3$, and R$_4$ independently represent a hydrogen atom, an alkyl group having 1 to 10 carbon atoms, and R$_3$ and R$_4$ may together form a ring;

in a hydrocarbon medium in the presence of a catalyst formed of a hydrocarbon-soluble vanadium compound and a halogen-containing organic aluminum compound to form a random copolymer in which the molar ratio of ethylene/polycyclic monomer represented by general formula (I) is in the range of from 90/10 to 10/90; and a substantial part of the units derived from the polycyclic monomer represented by general formula (I) have a structure represented by general formula (II):

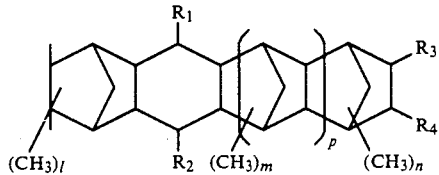

wherein e, m, n, p, R$_1$, R$_2$, R$_3$ and R$_4$ are as defined above; and the intrinsic viscosity ($\eta$) of the random copolymer is 0.1 to 15 dl/g, as measured at 135° C. in decalin.

6. A process for the preparation of a random copolymer according to claim 5, wherein the polycyclic monomer is a pentacyclo (10.2.1.1$^{5,8}$.0$^{2,11}$.0$^{4,9}$) hexadec-6-ene represented by general formula (III):

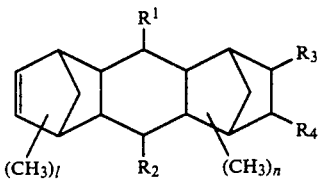

(III)

wherein
e and n are 0 or 1,
$R_1$, $R_2$, $R_3$, and $R_4$ independently represent a hydrogen atom or an alkyl group having 1 to 10 carbon atoms, and $R_3$ and $R_4$ may together form a ring; and in the obtained copolymer, a substantial part of the units from said polycyclic monomer have a structure represented by general formula (IV):

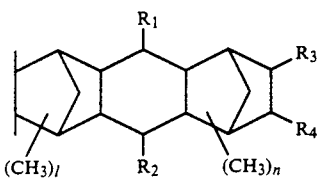

(IV)

wherein
e, n, $R_1$, $R_2$, $R_3$ and $R_4$ are as defined above.

7. A process for the preparation of a random copolymer according to claim 6, wherein a monomer mixture consisting essentially of ethylene and the pentacyclo((10.2.1.1$^{5,8}$.0$^{2,11}$.0$^{4,9}$)-hexadec-6-ene is copolymerized.

8. A process for the preparation of a random copolymer according to claim 6, wherein
ethylene is copolymerized with
a polycyclic monomer represented by general formula (III) and
at least one monomer selected from the group consisting of α-olefins having 3 to 10 carbon atoms and cyclo-olefins having 5 to 18 carbon atoms
to obtain a copolymer in which
the molar ration of ethylene/polycyclic monomer represented by general formula (III) is in the range of from 90/10 to 10/90;
the molar ratio of the monomer selected from the group consisting of the α-olefins and cyclo-olefins to the polycyclic monomer represented by general formula (III) is not higher than 90/10; and
a substantial part of the units derived from the polycyclic monomer represented by general formula (III) have a structure represented by general formula (IV).

9. A process for the preparation of a random copolymer according to claim 5, wherein
the hydrocarbon-soluble vanadium compound is selected from the group consisting of $VCl_4$, $VCl_3$, and compounds represented by the formula $VO(OR)_tX_{3-t}$ in which R represents an alkyl group having 1 to 10 carbon atoms, X represents a halogen atom and t is a number from 0 to 3;
the halogen-containing organic aluminum compound is selected from the group consisting of compounds represented by $R'_uAlX'_{3-u}$ in which $R'$ represents an alkyl group having 1 to 10 carbon atoms, $X'$ represents a halogen atom and u is a positive number smaller than 3;
the molar ratio of the vanadium compound to the organic aluminum compound is in the range of from 1 to 30; and
the concentration of the vanadium compound in the hydrocarbon medium is 0.1 to 30 millimoles per liter.

10. An optical article comprising a molded body made of a random copolymer as set forth in claim 1.

11. An optical article comprising a molded body made of a random copolymer as set forth in claim 2.

* * * * *